(12) United States Patent
Stadtwald-Klenke (10) Patent No.: US 7,682,062 B2
(45) Date of Patent: Mar. 23, 2010

(54) ILLUMINATING DEVICE

(75) Inventor: Martin Stadtwald-Klenke, Blieskastel (DE)

(73) Assignee: Nanogate Advanced Materials GmbH, Saarbruecken (DE)

( * ) Notice: Subject to any disclaimer, the term of this patent is extended or adjusted under 35 U.S.C. 154(b) by 0 days.

(21) Appl. No.: 11/221,666

(22) Filed: Sep. 8, 2005

(65) Prior Publication Data

US 2006/0050532 A1     Mar. 9, 2006

Related U.S. Application Data

(60) Provisional application No. 60/644,879, filed on Jan. 18, 2005.

(30) Foreign Application Priority Data

| Sep. 9, 2004 | (EP) | .................................. 04021429 |
| Jan. 19, 2005 | (EP) | .................................. 05100313 |
| Mar. 10, 2005 | (EP) | .................................. 05005303 |

(51) Int. Cl.
 *F21V 7/04* (2006.01)
 *G09F 13/04* (2006.01)
 *G09F 13/08* (2006.01)

(52) U.S. Cl. ...................... 362/612; 362/617; 362/97.3

(58) Field of Classification Search ......... 362/617–620, 362/97.1–97.4, 612
See application file for complete search history.

(56) References Cited

U.S. PATENT DOCUMENTS

| 5,377,084 | A | * | 12/1994 | Kojima et al. ............... 362/618 |
| 5,742,433 | A | * | 4/1998 | Shiono et al. ............... 359/575 |
| 6,011,602 | A | * | 1/2000 | Miyashita et al. ............. 349/65 |
| 6,231,200 | B1 | * | 5/2001 | Shinohara et al. ............ 362/619 |
| 6,742,907 | B2 | * | 6/2004 | Funamoto et al. ........... 362/625 |
| 6,773,126 | B1 | * | 8/2004 | Hatjasalo et al. ............ 362/601 |
| 6,979,112 | B2 | * | 12/2005 | Yu et al. ..................... 362/600 |
| 7,039,286 | B2 | * | 5/2006 | Leu et al. .................... 385/129 |
| 7,052,168 | B2 | * | 5/2006 | Epstein et al. .............. 362/625 |
| 7,085,056 | B2 | * | 8/2006 | Chen et al. .................. 359/566 |
| 7,114,820 | B1 | * | 10/2006 | Parikka et al. .............. 362/602 |
| 7,142,768 | B2 | * | 11/2006 | Tseng ........................ 385/146 |
| 7,527,416 | B2 | * | 5/2009 | Lin ............................ 362/626 |
| 2004/0240232 | A1 | * | 12/2004 | Choi et al. .................. 362/583 |

FOREIGN PATENT DOCUMENTS

EP     1194915 B1     9/2004

* cited by examiner

*Primary Examiner*—Jong-Suk (James) Lee
*Assistant Examiner*—David J Makiya
(74) *Attorney, Agent, or Firm*—Ohlandt, Greeley, Ruggiero & Perle, LLP (57) ABSTRACT

An illuminating device for backlighting flat displays, in particular displays for mobile applications, is provided. The illuminating device includes a light source and a light guiding member into which light emitted from the light source is coupled in and is coupled out therefrom at an exit surface. The exit surface has a surface structure including diffractive surface elements for light propagation, wherein all surface elements have a surface structure with a constant amplitude.

25 Claims, 5 Drawing Sheets

| Zone | 1 | 2 | 3 | 4 | 5 | 6 | 7 | 8 | 9 | 10 | 1_1 | 1_2 | 1_3 | 1_4 |
|---|---|---|---|---|---|---|---|---|---|---|---|---|---|---|
| Length [mm] | 28 | 28 | 28 | 44 | 44 | 44 | 44 | 44 | 44 | 44 | 8 | 8 | 8 | 8 |
| Width [mm] | 5.3 | 5.3 | 5.3 | 5.3 | 5.3 | 5.3 | 5.3 | 5.3 | 5.3 | 5.3 | 5.3 | 10.6 | 5.3 | 10.6 |
| Distance surface el. [µm] | 7.6 | 7.2 | 6.9 | 6.5 | 6.2 | 6.0 | 5.9 | 5.6 | 5.3 | 5.0 | 7.4 | 6.8 | 7.4 | 6.8 |

Fig.5

| Zone | 1 | 2 | 3 | 4 | 5 | 6 | 7 | 8 | 9 | 10 | 1_1 | 1_2 | 1_3 | 1_4 |
|---|---|---|---|---|---|---|---|---|---|---|---|---|---|---|
| Length [mm] | 28 | 28 | 28 | 44 | 44 | 44 | 44 | 44 | 44 | 44 | 8 | 8 | 8 | 8 |
| Width [mm] | 5.3 | 5.3 | 5.3 | 5.3 | 5.3 | 5.3 | 5.3 | 5.3 | 5.3 | 5.3 | 5.3 | 10.6 | 5.3 | 10.6 |
| Distance surface el. [µm] | 12 | 12 | 12 | 12 | 12 | 11 | 11 | 11 | 10 | 10 | 12 | 12 | 12 | 12 |

Fig.6

| Zone | 1 | 2 | 3 | 4 | 5 | 6 | 7 | 8 | 9 | 10 | 1_1 | 1_2 | 1_3 | 1_4 |
|---|---|---|---|---|---|---|---|---|---|---|---|---|---|---|
| Length [mm] | 28 | 28 | 28 | 44 | 44 | 44 | 44 | 44 | 44 | 44 | 8 | 8 | 8 | 8 |
| Width [mm] | 5.3 | 5.3 | 5.3 | 5.3 | 5.3 | 5.3 | 5.3 | 5.3 | 5.3 | 5.3 | 5.3 | 10.6 | 5.3 | 10.6 |
| Distance surface el. [µm] | 6 | 5 | 5 | 5 | 5 | 5 | 5 | 5 | 4 | 4 | 6 | 5 | 6 | 5 |

ILLUMINATING DEVICE

CROSS-REFERENCE TO RELATED APPLICATIONS

This application claims the benefit under 35 U.S.C. §119 of U.S. Provisional Application Ser. No. 60/644,879 filed on Jan. 18, 2005, European Patent Application No. 04 021 429.8 filed on Sep. 9, 2004, European Patent Application No. 05 100 313.5 filed on Jan. 19, 2005, and European Patent Application No. 05 005 303.2 filed on Mar. 10, 2005, the entire contents of all of which are incorporated by reference herein.

BACKGROUND OF THE INVENTION

1. Technical Field

The invention refers to an illuminating device for backlighting flat displays, in particular displays for mobile applications.

2. Related Prior Art

Known illuminating devices for displays for mobile applications comprise a light source, which may be a tubular light source (CCFL), for example. The light emitted from the light source is coupled into a light guiding member of wedge-shaped cross section at an end face thereof. Specifically because of the wedge-shaped configuration of the light guiding member, a total reflection of the light beams occurs at the phase boundary and the light beams emerge from the surface of the wedge-shaped light guiding member through corresponding scattering centres. The surface of the wedge-shaped light guiding member is arranged opposite the display to be transilluminated. The surface of the light guiding member is structured such that the light emerges from the light guide by refraction. The light thus refracted is collimated and directed by a plurality of films arranged between the light guiding member and the display, such that a substantially white light reaches the display. The structure of such illuminating devices is complicated, the more so, since a plurality of films have to be placed into a frame or the like, for example, and it has to be ensured that a slipping or the like of the films is avoided. Due to the complicated structure, the manufacturing costs are high. Moreover, there is a risk of operational failures.

From EP 1 194 915 a light guiding member for mobile phone displays is known. Light from a light source, such as a LED, is coupled into the light source. To couple the light out, the light guiding member has a diffractive structure on a surface thereof. Here, the entire surface is provided with different gratings such that the gratings immediately adjoin each other. The gratings are configured such that they have different diffraction efficiencies to obtain uniformity of the coupling out of the light. Different diffraction efficiencies of the gratings are achieved by the amplitude of the individual gratings or the height of the structure varying. Making such a surface structure with different grating amplitudes is extremely difficult. Further, due to the immediate contiguity of the individual gratings, it is likely that diffraction effects that are hard to predict, such as undesired interferences, for example, because of the precision technically difficult to obtain.

It is the object of the invention to provide an illuminating device for backlighting flat displays that guarantees an increased operational reliability with a high efficiency and at low cost.

SUMMARY OF THE INVENTION

The object is solved according to the invention with an illuminating device for backlighting flat displays. The illuminating device includes a light source and a light guiding member into which light emitted from the light source is coupled in and is coupled out therefrom at an exit surface. The exit surface has a surface structure including diffractive surface elements for light propagation. The surface elements have a surface structure with a constant amplitude.

The present illuminating device is particularly suitable for flat displays, e.g. displays of mobile phones, PDA displays, cameras and the like. Further, the illuminating device is also suitable for backlighting advertising boards, display panels and the like. The illuminating device comprises a light source that may include one or more LEDs or CCFLs. The light emitted by the light source is coupled into a light guiding member. Preferably, the light guiding means is made from a transparent plastic material, such as PPMA, PC, PET, PT etc., and/or a mineral glass. The light coupled into the light guiding member is coupled out at an exit surface of the light guiding member. When the illuminating device is used for a mobile phone, the exit surface is arranged opposite the display so that light is emitted from the light guide towards the display. According to the present invention, the exit surface has a surface structure with diffractive surface elements for light propagation. By providing preferably a plurality of such surface elements, the films provided in prior art between the light guiding member and the display can be omitted, since a sufficiently good illumination can be achieved due to the diffractive surface elements of the present invention.

Possibly, one or more lateral surfaces of the light guiding member are provided with reflectors to increase the amount of light emerging at the exit surface. Likewise, the light source can be partly surrounded by reflectors to increase the amount of light coupled into the light guiding member.

Using the present illuminating device, it is possible to omit any further light-guiding components, such as films, between the exit surface of the light guiding member and the display. Besides the above described reflection elements, the invention thus provides for a transflective or transmisive background illumination without any further light guiding components. Due to the provision of diffractive surface elements on the exit surface of the light guiding member, the structure of the illuminating device can be simplified. This enhances the quality and, in particular, the service life of the illuminating device.

Preferably, the individual surface elements are configured such that they act as diffraction elements that preferably create a collimated light bundle with spectral light splitting. To this effect, the individual surface elements preferably comprise surface structures of undulated cross section, the pitch between the undulations being selected depending on the wavelength to be deflected. Preferably, individual surface elements comprise different diffraction gratings. It is particularly preferred that the surface elements are arranged such that by superposing at least two adjacent light bundles mainly monochromatic light and/or white light is created. Here, monochromatic light is a wavelength range of ±100 nm, in particular ±50 nm. By providing such surface elements, according to the invention, it is thus possible to generate a largely monochromatic, in particular collimated light with a high light flux density.

The configuration of the surface of the surface elements further allows to adjust the irradiation direction of the light from the exit surface. To this effect, the diffraction grating provided at the surface elements must be modified according to the Fraunhofer diffraction rules. The adjustability preferably is within the range from 0-90° to the exit surface.

Likewise, it is possible to adjust the color temperature of the irradiated light by the selection or the configuration of the structure of the surface elements. Preferably, an adjustment of the color temperature in a range from 3,000 K to 10,000 K is possible.

By the present configuration of the exit surface with diffractive surface elements, especially spectral splitting is avoided or significantly reduced. Further a sufficient amplification of light and a simultaneous low energy consumption are achieved. Moreover, due to the provision of the diffractive surface elements and especially due to the arrangement of the surface elements, a good collimation of the light can be achieved. Here, it is particularly advantageous that these advantages can be obtained for light amplification or collimation without providing further light guiding systems such as diffractively or reflectively acting films.

The present diffractive surface elements preferably have a size of 0.04 $\mu m^2$ to 10,000 $\mu m^2$, in particular 0.04 $\mu m^2$ to 500 $\mu m^2$. Due to the provision of such small surfaces, it is possible, even with very small flat displays, such as displays for mobile applications, to provide a plurality of surface elements. Here, the mutual spacing between the individual surface elements preferably is in the range from 0-100 $\mu m$, in particular from 0-50 $\mu m$, and particularly preferred from 0-15 $\mu m$. It is particularly preferred that the surface elements have a mutual distance of >0. Preferably, the distance is at least 1 $\mu m$, in particular at least 3 $\mu m$. This is advantageous in that in regions of the light guiding member, in which more light is to be coupled out, the distance between the surface elements can be reduced, whereas in regions in which a lesser quantity of light is to be coupled out a greater distance can be provided. Thereby, a good uniformization of the luminance distribution can be obtained. Further, it is easier in terms of manufacture to arrange the individual surface elements always with the same spacing. If, for example, the surface elements are produced from a curing lacquer in combination with a forming element or a negative, spacing the surface elements avoids a corruption at the boundaries of the surface elements, e.g. by the formation of lacquer webs. Moreover, spacing the individual surface elements ensures that refractions or corruptions of the diffraction caused by adjoining surface structures are avoided.

Preferably, a plurality of surface elements with different surface structures are comprised in a group of surface elements. In doing so, the different surface structures are selected such that a group of surface elements emits substantially monochromatic and/or white light. The type of surface structure, in particular the change in the wavelength of the light caused by the surface structure, is determined depending on the wavelength ranges emitted by the light source.

Preferably, a group of surface elements comprises at least two surface elements with different surface structures. Preferably, the group of surface elements comprises at least four, in particular at least six surface elements, each having another surface structure.

Since, according to a preferred embodiment of the present invention, the individual surface elements have the same surface structure in terms of height or amplitude, the diffraction efficiency of the individual surface elements is identical. Mere production-related variations of a few percent may occur which have only a slight impact on the diffraction efficiency.

It is particularly preferred to configure the individual surface elements such that the amplitude of the different surface structures is constant and only the frequency is changed. Depending on the type of surface structure, which does not necessarily have to be a sinusoidal surface structure, all raised portions, generally speaking, have the same height, yet have different mutual distances. This results in the fact that light emitted from the light source is diffracted differently by the individual surface elements. In this context, it is particularly advantageous that varying distances are simpler to produce than varying heights.

The surface elements preferably arranged in groups of surface elements, which may be six surface elements of different surface structures, for example, preferably have the same amplitude of 550 nm. The individual surface elements of a group of surface elements have a respective frequency of 490 nm, 503 nm, 517 nm, 530 nm, 575 nm and 620 nm, for example. In particular, the diffractive surface elements have a sinusoidal surface structure. The distance between the individual surface elements is preferably in the range from 1 to 100 $\mu m$, in particular from 1 to 50 $\mu m$ and, most preferred, in the range from 1 to 15 $\mu m$.

The manufacturing of such small surface structures and surface elements is described for example in EP 05 003 358, the disclosure of which is incorporated herein by reference. A suitable material for making the surface elements preferably has the following composition:

11 g 1H,1H,2H,2H-perfluoro octyle acrylate were mixed with 8 g dipropylene glycol diacrylate, 0.1 g Irgacure® 819 and 0.2 g Irgacure® 184 sold by Ciba Spezialità tenchemie Lampersheim GmbH. 60 $\mu l$ of this mixture were applied on a nickel plate of 2 by 2 cm, whose surface was patterned with a negative form of a mold body with scattering centers. Subsequently, a small plate of PMMA, being 1 mm thick and 1 by 1 cm in size, was applied on the surface of the mixture on the nickel plate. Thereafter, the sandwich thus obtained on the nickel plate with the mixture therebetween was subjected to 2 seconds of UV radiation from a conventional quicksilver lamp. Then, the substrate with the cured forming compound bonded thereto was removed from the negative mold.

The light guiding member may be wedge-shaped in cross section. However, it is preferred to provide a parallelepiped light guiding member, the light entry surface being a side face of the parallelepiped. Preferably, the parallelepiped light guiding member is a cuboid. Providing a parallelepiped light guiding member is possible due to the good light efficiency obtained because of the diffractive surface elements provided according to the invention. Thus, a substantial simplification of the production is achieved. The thickness of the parallelepiped light guiding member is preferably in the range from 0.1-3 mm.

Preferably, a light source which may be one or a plurality of LEDs or CCFLs, is arranged within and/or outside the light guiding member. The surface elements are arranged depending on the position of the light source or the light sources. By correspondingly arranging the surface elements, the different light intensities etc. existing at different locations of the exit surface can be compensated so that a uniform, i.e. in particular collimated and monochromatic and/or white light is emitted at the exit surface by the surface elements.

To increase the amount of light directed towards the exit surface, reflectors may be provided. These partly surround the light source, for example. A rod-shaped light source, for example, is preferably arranged in the focal point of a parabolic reflector. Likewise, a plurality of planar reflectors may be provided in addition or instead of the parabolic reflector. Further, outer surfaces of the light guiding member that are not the exit surface of the light guiding member, reflectors may be provided to avoid an inadvertent loss of light. A corresponding guiding of light may also be obtained by providing surface elements according to the invention for example at the side faces of the light guiding member. A purposeful guiding of light and/or collimation and/or spectral influencing may further also be achieved by providing present surface elements on a surface of the light source.

In addition to or instead of providing surface elements at an exit surface of the light guiding member, such surface elements may also be provided on the opposite side, i.e. a bottom side, of the light guiding member. The light diffracted by the surface elements is thus directed through the light guiding member towards the display.

In a particularly preferred embodiment of the invention, the distance between adjacent surface elements that are especially provided at the exit surface or the opposite surface, decreases as the distance to the light source increases. This allows for the fact that the light intensity is higher in the vicinity of the light source and decreases as the distance to the light source increases. For example, a light source arranged within the light guiding member may be surrounded by concentric circles of surface elements, the mutual distance of the circles decreasing as the distance to the light source increases. Depending on the type of light source, in particular the radiation characteristics of the light source, different arrangements of the surface elements adapted thereto may be advantageous.

Thus, a periodic as well as a non-periodic arrangement of the surface elements is possible. Preferably, the surface elements are arranged depending on the type and the position of the light source or the light sources.

A preferred embodiment of the invention a flat display with a liquid crystal element, such as a LCD element. According to the invention, the liquid crystal element is backlit with an illuminating device configured corresponding to the above specification.

Known display or liquid crystal elements according to prior art comprise a light element, such as a light box. A plurality of fluorescent tubes, in particular CCFLs, are arranged as light sources in the light element. To make the light emitted by the fluorescent tubes more uniform and thus to make the illumination of the liquid crystal element more uniform, foils are arranged between the fluorescent light tubes and the liquid crystal element. These foils are so-called BEF and DBEF Foils, respectively. A BEF foil is to enhance luminosity. This is achieved by providing a plurality of prisms on the foil. The DBEF foil is used to change the polarity of the light reflected from the rear side of the liquid crystal element and to return the light back towards the liquid crystal element. Further, PRF foils are used to change the polarity. Providing such foils, however, has the drawback that the foils absorb a part of the light.

In the present flat display, the BEF foil and preferably also the DBEF foil and the PDF foil are replaced with the light guide member configured according to the invention. Preferably, a plurality of light tubes, such as CCFLs, are provided. A light guide member according to the invention is arranged in front of the light tubes, which, as described above, comprises a plurality of surface elements or groups of surface elements. It is particularly preferred that the light guide member has one zone per light tube, which zone is arranged preferably in parallel with the light tube and has a plurality of surface elements or groups of surface elements. Here, the individual zones may be identical in configuration. Thus, production costs can be reduced.

Preferably, the individual surface elements or groups of surface elements in the individual zones are arranged in lines and columns. Here, it is particularly preferred that the distance between the single lines decreases as the distance from the light tube increases. Thus, the light exiting from the exit surface of the light guide member can be made uniform, i.e. especially the luminosity distribution and/or the wavelength distribution can be made more uniform. As a result, the BEF foil and possibly also the DBEF foil and the PRF foil may be omitted.

Possibly, the zones may be divided in individual sub-zones. Preferably, the sub-zones are rectangular zones, the number of surface elements or surface element groups in sub-zones that are located at the lateral edge of the light guide member are larger than sub-zones situated further inward. Moreover, it is possible to provide an non-periodic arrangement of the surface elements or the groups of surface elements instead of providing zones and sub-zones. Here, the individual surface elements or groups of surface elements are arranged depending on the luminosity characteristics of the light tubes. Preferably, the density of the surface elements or the groups of surface elements is higher in the corners and at the edges.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings in which.

DESCRIPTION OF PREFERRED EMBODIMENTS

Figure 1:
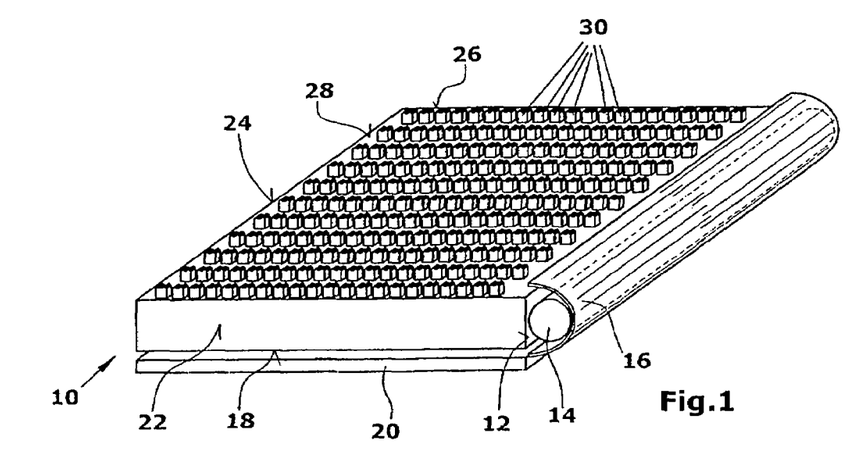
FIG. 1 is a schematic perspective view of an illuminating device.

The present illuminating device comprises a light guiding member 10 that is cuboid in the embodiment illustrated and may be made, for example, of a transparent resin or a plastic material such as PPMA or the like. In the embodiment shown, a rod-shaped light source is arranged along one side face 12 of the light guiding member 10, the longitudinal axis of the light source 14 being arranged in parallel to the side face 12. The light source 14 is surrounded by a parabolic reflector 16, whose open side is directed towards the side face 12. Thus, the amount of light coupled into the side face 12 is augmented. The light source 14, which may be a plurality of LEDs instead of the light tube shown, preferably has a light density in the range from 20,000-50,000 cd/m². When providing a tubular light source 14, the same is preferably arrange in the focal axis of the parabolic reflector 16.

The bottom face 18 of the light guiding member 10 is provided with a reflector 20 which may be a reflector film or the like. Possible, further reflectors may be arranged at the side faces 22 and/or 24 and/or 26. Instead of providing reflectors, the corresponding surfaces may also be polished. Possibly, vapour depositing a reflection layer may be advantageous.

A plurality of diffractive surface elements 30 is situated on the exit surface 28 of the light guiding member 10 so that a surface structure according to the invention is formed.

The individual surface elements 30 act as diffraction gratings. Here, different surface elements may be provided that are designed as linear diffraction gratings with different grating constants. The surface 32 (FIG. 2) of individual surface elements 30 is designed as a phase sine grating, for example. Here, each surface element 30 preferably comprises two sinusoidal half-waves.

The manufacture of the individual surface elements 30 and especially of the surface structure 32 of the surface elements 30 is effected according to the invention by photolithographic processes. Further, in a particularly preferred embodiment, the surface elements 30 may be manufactured as described in EP 05 003 358.

Figure 3:
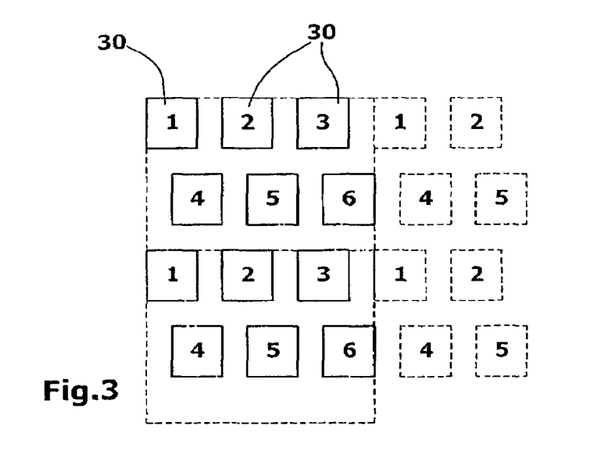
FIG. 3 illustrates an example of a possible arrangement of surface elements.

In a particularly preferred embodiment of the invention, the individual surface elements 30 are comprised into groups 33 of surface elements (FIG. 3). In the embodiment illustrated, a group 33 of surface elements comprises six surface elements 30 preferably arranged with gaps and a constant mutual distance therebetween. Each individual surface element 30 has a different surface structure so that a group 33 of surface elements substantially emits monochromatic or white light.

To couple out light of different wavelengths, different surface elements 30, i.e. surface elements 30 of different surface structure, are preferably provided. For example, as illustrated in the embodiment of FIG. 3, these may be six different surface elements 30 designated 1 to 6 in FIG. 3. As is evident from FIG. 3, the different surface elements 1 to 6 of the embodiment illustrated that are used to couple out a certain wavelength, respectively, are arranged as a repeating structure.

In the embodiment illustrated, the surface elements 30 are square and have an edge length of about 15 μm.

Figure 4:
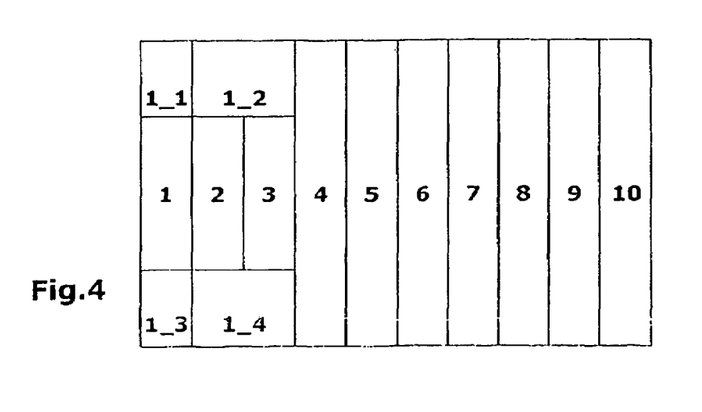
FIG. 4 illustrates an example of a division of the exit surface of the light guiding member into different zones.

In a particularly preferred embodiment (FIG. 4), the individual surface elements 30 are arranged in zones. In FIG. 4, the zones are designated as 1 to 10 and 1_1 to 1_4. The dimensions of the zones and the distance of the surface elements within the zones are obvious from the table illustrated in FIG. 5.

Figure 5:
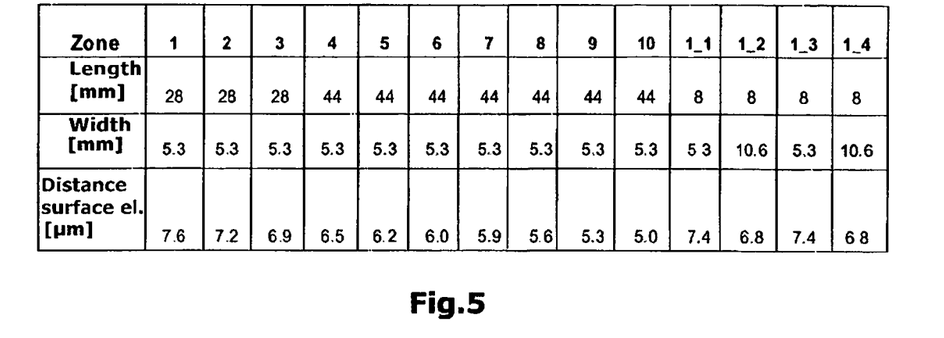
FIG. 5 is a first table describing or defining the zones illustrated in FIG. 4.

In the embodiment illustrated in FIGS. 4 and 5, the light source is located on the left side, i.e. beside the zone designated as 1, in FIG. 4. Starting from the light source, the mutual distance of the individual surface elements 30 decreases by degrees as the distance to the light source increases. Within the individual zones or regions, the surface elements have a constant distance. However, it is also possible that the surface elements have different distances within one zone. In particular, the distance in the longitudinal direction, i.e. from the left to the right in FIG. 4, may vary from the distance perpendicular to the longitudinal direction.

Using the simulation software "Light Tools" of ORA, an illuminating device as described with reference to FIGS. 1 to 5 was constructed with the zones defined in FIGS. 4 and 5 and the homogeneity, the color, the light density, the illuminating power as well as the collimation were measured. The corresponding measures were taken at nine points located in the corners, at the centers of the edges at about 2 mm from the edge, and in the center of the light guide.

With an arrangement of the surface elements as defined in FIGS. 4 and 5, the simulation performed lead to the following results:
homogeneity: 91%
color: white
average illuminating power: 1,600 lux
average light density: 2,950 nits
direction of collimation: 17°

Figure 6:
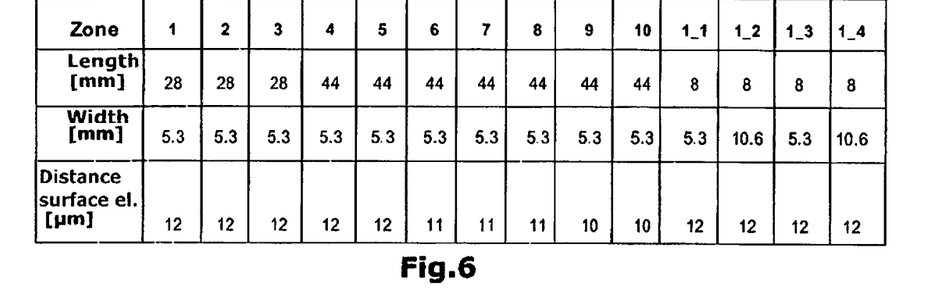
FIG. 6 is a second table describing or defining the zones illustrated in FIG. 4.

In another simulation, the distances between the surface elements 30 in the individual zones (FIG. 4) were defined as evident from FIG. 6.

Here, the following results were obtained:
homogeneity: 86%
color: neutral (slightly blue)
average illuminating power: 1,000 lux
average light density: 1,900 nits
direction of collimation: 17°

Figure 7:
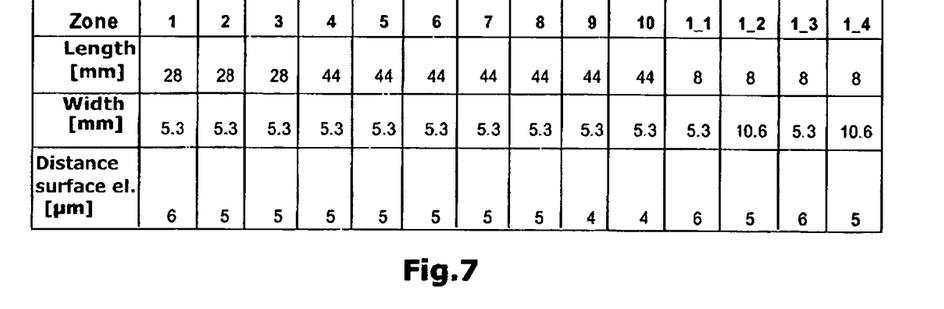
FIG. 7 is a third table describing or defining the zone illustrated in FIG. 4, FIGS. 8 and 9 are schematic top plan views of further embodiments of illuminating devices.

In another simulation, the distances between the surface elements 30 in the individual zones (FIG. 6) were defined as evident from FIG. 7.

Here, the following results were obtained:
homogeneity: approx. 78%
color: white
average illuminating power: 1,050 lux
average light density: 1,850 nits
direction of collimation: 17°

In another test, the zones 8, 9 and 10 were omitted, whereby a shorter light guide member 10 was examined, into which light was also coupled from the left corresponding to the light member illustrated in FIG. 4. The light guide member tested thus had dimensions of about 36 mm (length) and 44 mm (width), the length being measured in the direction of the zones, i.e. from left to right in FIG. 4. the distances between the individual surface elements within the zones correspond to those defined in FIG. 5 for the zones 1 to 6, the zones 1_1, 1_2, 1_3, and 1_4.

Here, the following results were measured:
homogeneity: approx. 88%
color: white
average illuminating power: 1,100 lux
average light density: 2,150 nits
direction of collimation: 17°

In further tests, the surface of the light guide member 10 was not divided into zones, but a constant distance between the individual surface elements was selected. Here, the following results were obtained:
distance: 4 μm
homogeneity: approx. 75%
color: white
average illuminating power: 1,850 lux
average light density: 3,350 nits
direction of collimation: 17°
distance: 6 μm
homogeneity: approx. 78%
color: white
average illuminating power: 1,600 lux
average light density: 2,400 nits
direction of collimation: 17°
distance: 8 μm homogeneity: approx. 82%
color: white
average illuminating power: 1,400 lux
average light density: 2,500 nits
direction of collimation: 17°
distance: 10 μm
homogeneity: approx. 84%
color: white
average illuminating power: 1,200 lux
average light density: 2,200 nits
direction of collimation: 17°
distance: 11 μm
homogeneity: approx. 87%
color: white
average illuminating power: 1,200 lux
average light density: 2,150 nits
direction of collimation: 17°

From the above test results, the following conclusions may be drawn:
1. The arrangement and distribution of the diffractive surface elements allow to set great homogeneities with regard to the light distribution.
2. Even with relatively less favourable surface arrangements with little homogeneity, the mixing of colors into white is always given.
3. The direction of collimation may be set independent of the distribution of the surface elements.
4. The light intensity is a function of the distance between the dots.

In particular when using the present illuminating device as a backlight for mobile phones, where a homogeneity of 75% or more is acceptable, a high-quality illumination of a display is achieved that is agreeable to the user. Specifically, aimed directions of collimation can be achieved in combination with a predetermined color temperature without the aid of light guiding foils. Thus, further miniaturization of the overall system is possible, while at the same time the number of components is reduced and the layout is highly flexible.

Figure 8:
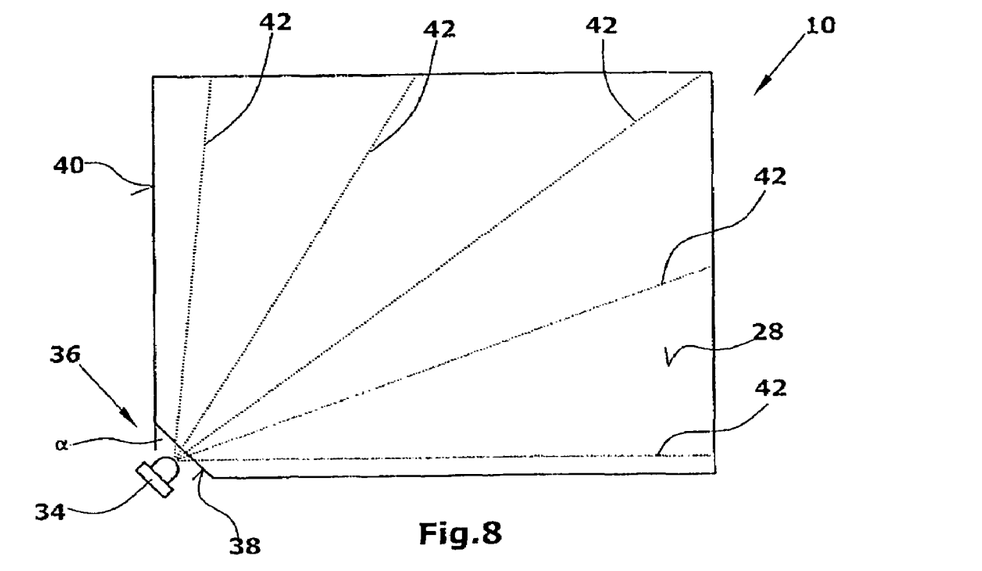
Figure 9:
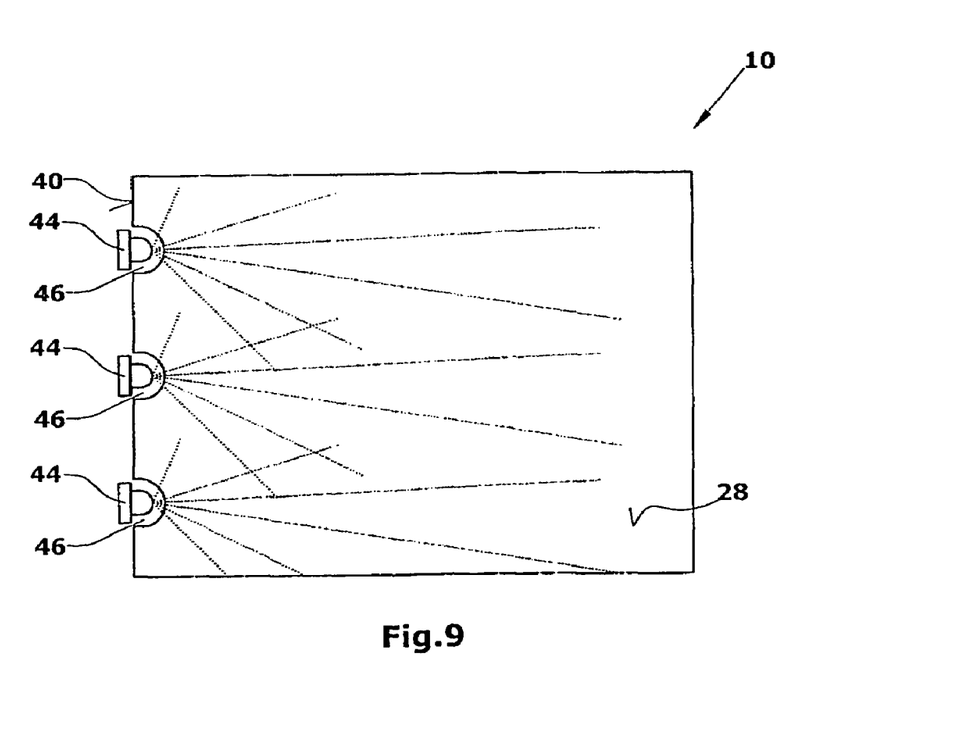

FIGS. 8 and 9 illustrate two other embodiments of illuminating devices that are particularly suitable as backlights for mobile phones.

The light guide members 10 are basically configured as described with respect to the previous Figures. The light sources are LEDs. In the embodiment of FIG. 8, a single LED 34 is arranged in a corner of the light guide member 10. The corresponding corner 36 is preferably chamfered ao that the exit side of the LED 34 is arranged within the corner or within the rectangular light guide member 18. Hereby, the light is coupled into the light guide member 10 via a chamfered or inclined surface 38. Since the light guide member 10 is not square but conventionally rectangular, the chamfer is not made under an angle of 45° but preferably such that an angle α between the short side 40 and the inclined surface 38 is less than 45°.

In the embodiment illustrated, the arrangement of the individual surface elements or the individual groups of surface elements is such that light is coupled out as uniformly as possible. Here, the distance between the individual surface elements or groups of surface elements in the direction of the dash lines 42 changes such that the distance between the individual elements or groups decreases as the distance from the LED increases.

The embodiment of the illuminating device illustrated in FIG. 9 also comprises LEDs 44 as light sources, where in the embodiment illustrated three LEDs 44 are arranged at a short side 40 of the light guide member 10. Here, the light guide member 10 preferably comprises recesses 46 at the short side 40. Preferably, the recesses 46 are semicircular in shape. In the embodiment illustrated, the recesses 46 extend over the entire thickness of the light guide member 10. It is also possible to provide hemispherical recesses, the diameter of the sphere being smaller than the thickness of the light guide member 10.

In this embodiment, the surface elements or the groups of surface elements are again arranged such that a umiformization of the luminosity distribution at the exit surface 20 is obtained.

Of course, the different embodiments described may be combined. For example, LEDs may be provided on several sides. Specifically, a plurality of LEDs is arranged about the entire circumference of the light guide member 10. Similarly, a combination of the embodiments illustrated in FIGS. 8 and 9 is possible. In particular, it may be feasible to combine LEDs with one or several CCFL tubes. For example, the illuminating device illustrated in FIG. 1 can be modified such that a respective LED is provided in the two corners opposite the CCFL tube 14, as illustrated in particular in FIG. 8. Thus, a good illumination of these two corners which are at a great distance from the CCFL tube 14 can be guaranteed in a simple manner.

Figure 10:
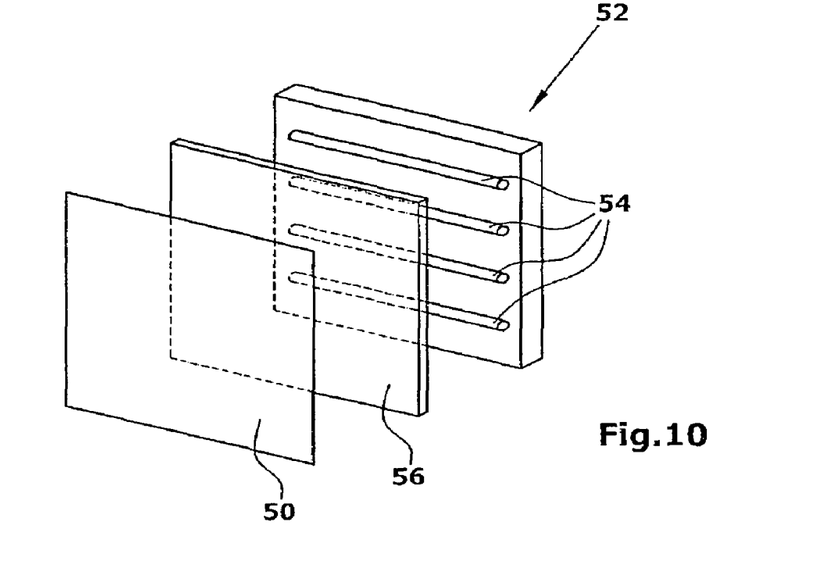
FIG. 10 is a schematic illustration of a flat display in an exploded sketch.

In a preferred embodiment of the present illuminating device, the same is provided in a flat display. The essential element of a flat display is a liquid crystal 50 (FIG. 10). The liquid crystal element typically is a LCD element. Further, a light box or the like is provided as a light source 52, comprising a plurality of mutually parallel light tubes 54. Preferably, the light tubes 54 are CCFLs.

According to prior art, several foils are provided between the light box 52 and the liquid crystal element 50. These are so-called BEF, DBEF and PRF foils.

According to the present invention, at least the BEF foil is replaced with a light guide member 56. The light guide member 56 is basically configured as described above with respect to FIGS. 1-3.

Figure 11:
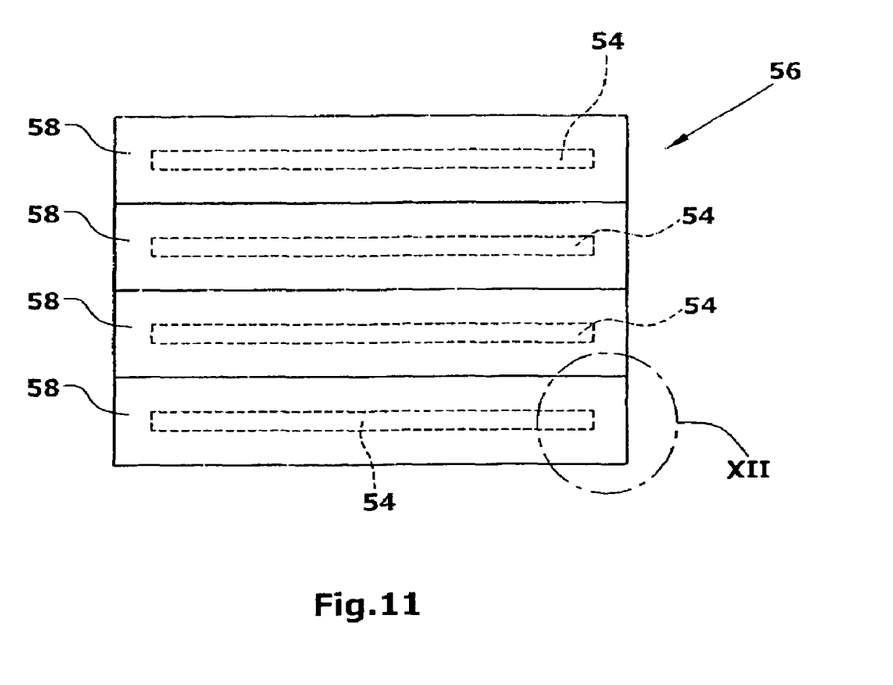
FIG. 11 is a schematic top plan view of a light guide member adapted according to the invention to be employed in a flat display and FIG. 12 an enlarged view of a portion of the light guide member.

The light guide member 56 preferably comprises a plurality of zones 58 oriented horizontally or parallel with the light tubes 54. Preferably, each zone 58 is associated with a light tube 54, the light tube 54 being located centrally behind the zone 58. Preferably, the zones 58 are structured identically, i.e. each zone has an identical arrangement of surface elements or groups of surface elements.

Figure 12:
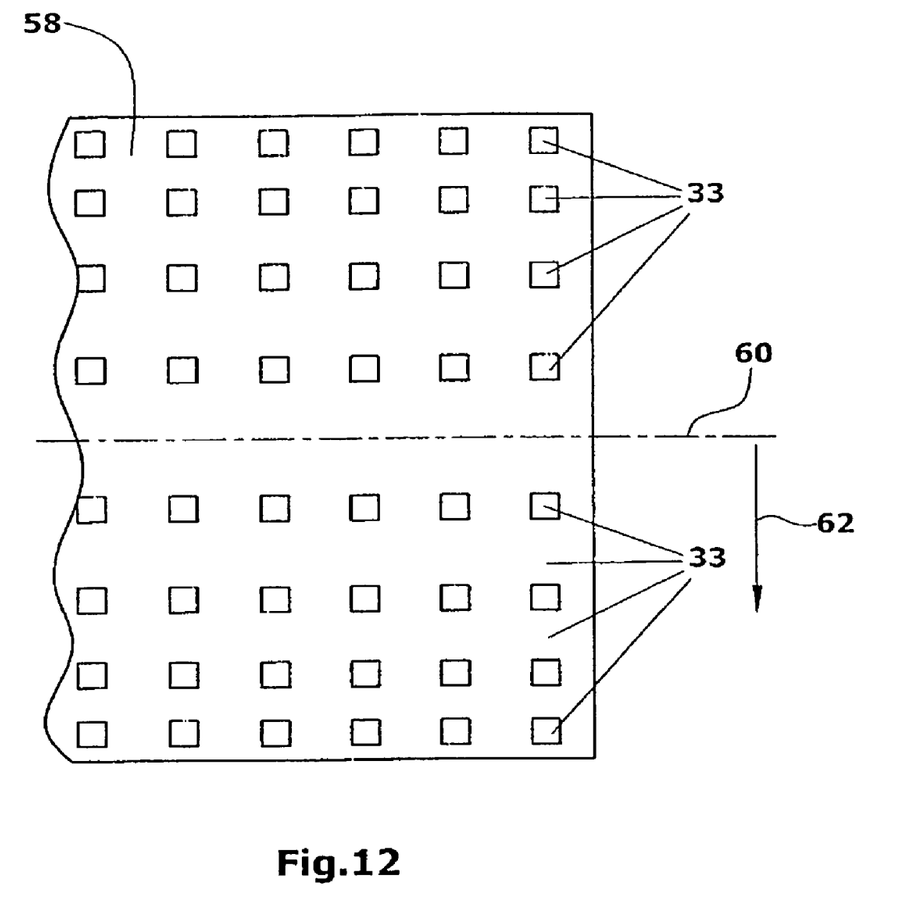

A preferred arrangement of groups 33 of surface elements is depicted in FIG. 12. Here, the individual groups 33 of surface elements are arranged symmetrically with respect to a center line 60. Starting from the center line 60, the distance between the individual groups 33 of surface elements decreases in the direction of the arrow 62, i.e. outward.

Figure 2:
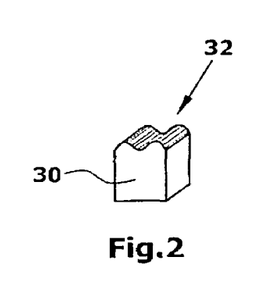
FIG. 2 illustrates an example of a surface structure of a surface element.

In the embodiment illustrated, the groups 33 of surface elements are arranged in lines and columns, the distance between the columns being constant. In a development of the invention, the zones 58 may be divided into preferably rectangular sub-zones. In FIG. 2, these would be arranged side by side. Here, it is possible to provide different gap distances within the individual sub-zones, the sub-zones at an edge, i.e. at the left or the right in FIG. 12, preferably having smaller gap distances.

Instead of or in addition to a light box 52 (FIG. 10), four or more light tubes 54 may be provided, for example, which are arranged along the circumference of the light guide member 56, so that the light is irradiated laterally into the light guide member 56. Again, the surface elements or the groups of surface elements are arranged such that the luminosity is distributed as uniformly as possible from the light guide member towards the LCD element. Preferably, the distance between the individual surface elements or groups of surface elements decreases towards the center of the light guide member. It is also possible to divide the surface of the light guide member into four zones or segments, preferably four identical rectangular segments, which preferably are each configured point symmetrically with respect to the center of the light guide member.

Although the invention has been described and explained with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

The invention claimed is:

1. An illuminating device for backlighting flat displays, comprising:
   a light source; and
   a light guiding member into which light emitted from the light source is coupled in and is coupled out therefrom at an exit surface, the exit surface having a surface structure including an array of individually spaced diffractive surface elements for light propagation, wherein the diffractive surface elements act as diffraction gratings and wherein individual surface elements comprise different diffraction gratings, and wherein the diffractive surface elements have a size at the exit surface of between 0.04 $\mu m^2$ and 10,000 $\mu m^2$, and wherein each diffractive surface element is cube shaped with a top surface being a light emitting surface having two sinusoidal half-waves.

2. The illuminating device of claim 1, wherein the diffractive surface elements act as diffraction elements that generate a collimated bundle of light with spectral light splitting.

3. The illuminating device of claim 1, wherein the diffractive surface elements are arranged such that by superposition of at least two adjacent bundles of light monochromatic light and/or white light is generated.

4. The illuminating device of claim 1, wherein the diffractive surface elements have a distance between adjacent diffractive surface elements of less than or equal to 100 $\mu m$.

5. The illuminating device of claim 1, wherein the distance between the adjacent diffractive surface elements decreases as a distance of the diffractive surface elements from the light source increases.

6. The illuminating device of claim 5, wherein the distance between the adjacent diffractive surface elements decreases step by step.

7. The illuminating device of claim 1, wherein the diffractive surface elements are arranged non-periodically.

8. The illuminating device of claim 1, wherein the exit surface comprises regions within which the diffractive surface elements a distance between adjacent diffractive surface elements that is the same distance.

9. The illuminating device of claim 1, wherein the light source is arranged within and/or without the light guiding member.

10. The illuminating device of claim 1, wherein the light source is partly surrounded by reflectors for enhancing the coupling in of the light.

11. The illuminating device of claim 10, further comprising a parabolic reflector and, wherein the light source, designed as a fluorescent tube, is arranged in a focus of the parabolic reflector.

12. The illuminating device of claim 1, wherein at least one side face of the light guiding member, which is not the exit surface, is provided with a reflector and/or has a reflective surface.

13. The illuminating device of claim 1, wherein the light source comprises one or a plurality of light emitting diodes.

14. The illuminating device of claim 1, wherein the light guiding member is parallelepiped in shape.

15. The illuminating device of claim 1, wherein the diffractive surface elements are comprised in a group of surface elements, the group of surface elements emitting monochromatic and/or white light.

16. A flat display comprising:
    a liquid crystal element; and
    an illuminating device backlighting the liquid crystal element, the illuminating device having a light source and a light guiding member having an exit surface, the exit surface having a surface structure including an array of individually spaced diffractive surface elements for light propagation, wherein the diffractive surface elements act as diffraction gratings and wherein individual surface elements comprise different diffraction gratings, and wherein the diffractive surface elements have a size at the exit surface of between 0.04 $\mu m^2$ and 10,000 $\mu m^2$ and wherein each diffractive surface element is cube shaped with a top surface being a light emitting surface having two sinusoidal half-waves.

17. The flat display of claim 16, wherein the light source comprises a plurality of parallel light tubes and wherein the light guiding member comprises one zone per light tube, the one zone being arranged parallel to the plurality of parallel light tubes and comprising surface elements and/or groups of surface elements.

18. The flat display of claim 17, wherein the surface elements and/or the groups of surface elements are arranged in lines and columns in the one zone, the distance between the lines decreasing as the distance from the light tube increases.

19. The flat display of claim 17, wherein the arrangement of the surface elements or the groups of surface elements in each zone is symmetrical to a center line, the center line being provided at the shortest distance from the light tube.

20. The flat display of claim 17, wherein each zone is divided into sub-zones, the sub-zones being rectangular in shape.

21. The flat display of claim 20, wherein the sub-zones provided laterally at an edge of the rectangular subzones comprise more surface elements or groups of surface elements than other sub-zones of the rectangular subzones.

22. An illuminating device for backlighting flat displays, comprising:
    a light guiding member having a side face, a bottom face, a plurality of side faces, and an exit surface comprising an array of individually spaced diffractive surface elements;
    a light source arranged along the side face of the light guiding member;
    a parabolic reflector surrounding the light source with an open side of the parabolic reflector being directed towards the side face so as to couple light emitted from the light source into the light guiding member; and
    a reflecting device provided at the bottom face and the plurality of side faces, wherein each diffractive surface element is cube shaped with a top surface being a light emitting surface having two sinusoidal half-waves.

23. The flat display of claim 22, wherein the light source comprises a rod-shaped light source or a plurality of LEDs.

24. The flat display of claim 22, wherein the reflecting device comprises reflector film, a polished surface of the light guiding member, or a vapor deposited reflection layer.

25. The flat display of claim 22, wherein the light emitting surface of each of the plurality of diffractive surface elements has a size of between 0.04 $\mu m^2$ and 10,000 $\mu m^2$.

* * * * *